Oct. 27, 1936.  E. C. ERICKSON  2,058,579

GAUGING DEVICE

Filed Sept. 13, 1933

INVENTOR
E.C. ERICKSON
BY J. MacDonald
ATTORNEY

Patented Oct. 27, 1936

2,058,579

UNITED STATES PATENT OFFICE 2,058,579

GAUGING DEVICE

Elmer C. Erickson, Woodridge, N. J., assignor to Bell Telephone Laboratories, Incorporated, New York, N. Y., a corporation of New York Application September 13, 1933, Serial No. 689,223

5 Claims. (Cl. 33—147)

This invention relates to gauging devices of the type used for comparing the dimensions of machine parts with respect to standard parts.

The object of this invention is to provide a gauging device of this character which will be simple, accurate and convenient in use.

According to this invention two motion amplifying mechanisms operate for projecting light beams on scales provided for indicating the difference of measurements between surfaces of a machine part with respect to a standard part. More specifically this device comprises a base for receiving the part to be measured and an upright supporting plate for mounting two independently operable motion amplifying mechanisms of the lever type provided for operating a pair of mirrors for projecting light beams onto scales placed in parallel relation to each other, the relative displacement of the light beams on the scales being an indication of the difference in the measurement of the machine part with respect to the standard part and means is provided for adjusting the light beams on the zero positions of the scales with respect to the standard part on the base of the machine.

Figure 1:
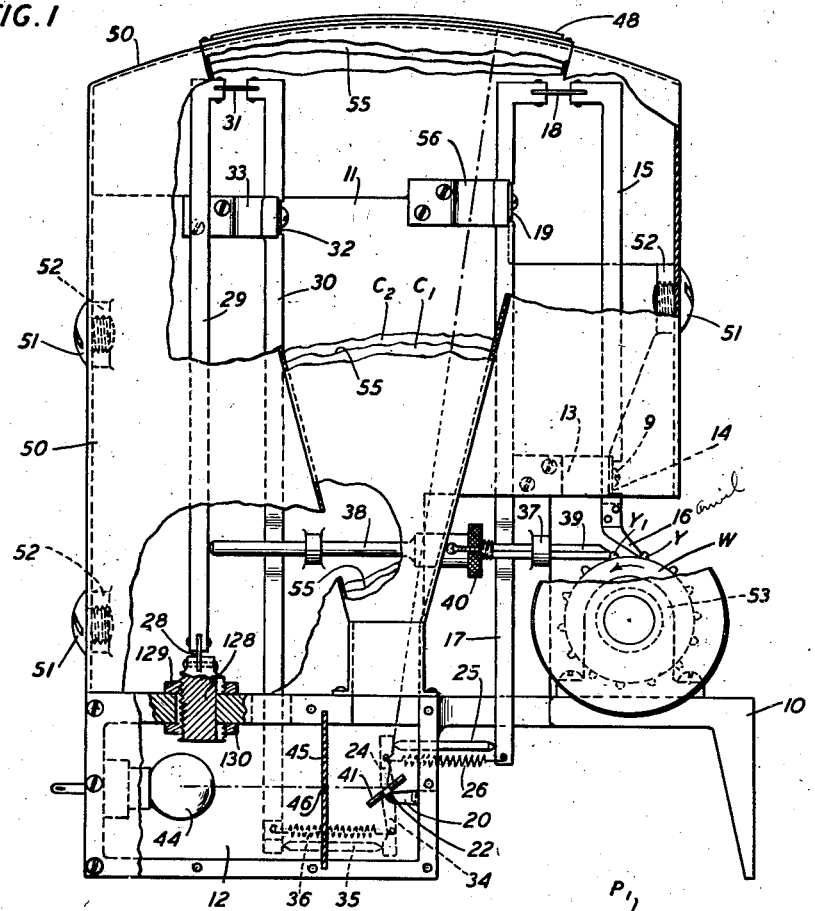
Figure 2:
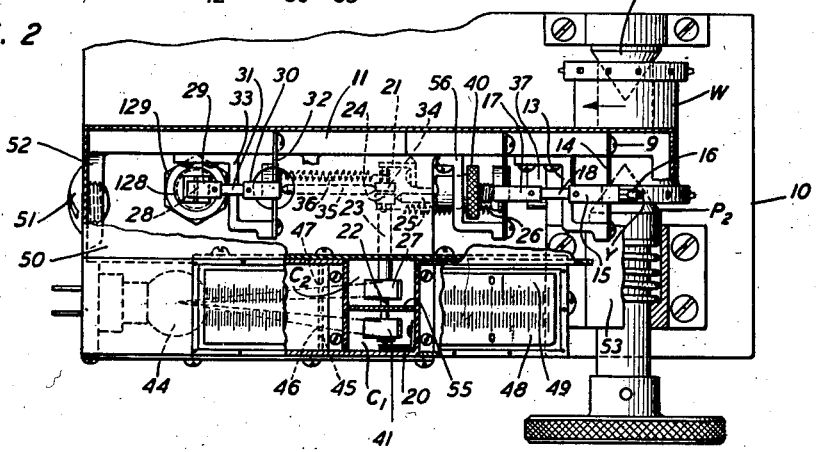

Other features of the invention and advantages will appear from the following description and by the claims appended thereto, reference being had to the accompanying drawing, in which Fig. 1 is a front elevation view shown with portions of the housing cut away; and Fig. 2 is a top view thereof with the casing partly shown in section.

In the drawing the numeral 10 represents a base which is formed with a recessed portion 12 and an upwardly extending plate 11 as shown. On plate 11 is mounted a bracket 13 for attaching one end of a ribbon-shaped spring 14, the other end of which is secured to the plate 11 as by screws 9. The spring 14 serves for pivotally mounting the double armed lever 15 to the lower disposed arm of which is securely attached an anvil piece 16. The upper disposed arm of lever 15 is operatively connected to a double armed lever 17 by a ribbon-shaped spring 18 and lever 17 in turn is pivoted on the plate 11 by a flat spring 19 one end of which is secured to the bracket 56 supported by plate 11, the other end being attached to plate 11.

In the recessed portion 12 formed in the base 10 is mounted a pair of brackets 20 and 21, best seen in Fig. 2, on which a shaft 22 is journaled. On this shaft is mounted a sleeve 23 having at one end a lever arm 24 held in operable relation with the lower arm of lever 17 by a rod 25 held in place under the tension of a spring 26 which is hooked to the lever arm 17 and arm 24 and on the other end of sleeve 23 is mounted a mirror 27 which is oscillated by the movement of lever 17, as will be hereinafter described in detail.

In the base 10 there is mounted a stud 128 which is axially adjustable therein under the actions of nut screws 129 and 130 and in the top end of member 128 there is securely attached a ribbon-shaped spring 28 for pivoting a lever arm 29 which is operatively connected at its upper end to a double armed lever 30 by a ribbon spring 31. Lever 30 like lever 17 is pivoted on a spring 32, having one of its ends secured to the plate 11 and the other to a bracket 33 also secured to the plate 11.

The downward extending arm of lever 30 is operatively connected to an arm 34, carried by the shaft 22, by a rod 35 held in place by a tension spring 36. On the other end of shaft 22 there is mounted a mirror 41 which is oscillated by the movement of lever arm 30 upon the axial movement of a rod which consists of a portion 38 threadedly engaging an anvil piece 39 of square cross-section fitted in a similarly shaped hole in a lug 37 laterally extending from plate 11 for preventing its turning movement upon the rotation of knob 40 as for adjusting the length of this rod with respect to the machine part W and the arm 29, the axial movement of screw 128 being effective to change the pivotal point of lever 29 with respect to rod 38 within the limits permitted by spring 31 in order to obtain the adjustment of the motion amplifying levers 29, 30 and 34 with respect to the motion amplifying levers 15, 17 and 24.

In the recessed portion 12 of the base 10 there is mounted a lamp 44 and a shield 45 provided with two adjacent and horizontally disposed slits 46 and 47 for directing beams of light on the mirrors 41 and 27.

Mirrors 41 and 27 are normally set at an angle for projecting the light beams generated by the lamp 44 onto the zero marks of a scale having two rows of lines 48 and 49 made of translucent material and mounted on the top of a casing 50, this casing being secured to the mounting plate 11 by a number of screws 51 threading in lugs 52 formed with the plate 11 and a plate 55 forms with the casing 50 two closed compartments $C_1$ and $C_2$ for the light projected onto the scales 48 and 49 by the mirrors 41 and 27.

On the base 10 there is mounted a fixture 53 consisting of a stationary point $P_1$ and an axially movable point $P_2$ for receiving the sprocket wheel W the spacing between the teeth of which is to be compared with a standard part in a manner that will be hereinafter described in detail.

In a typical example, the measuring of a machine part with respect to a standard part may be as follows: An accurately formed part as, for example, the sprocket wheel of a talking motion picture machine is placed in the fixture 53 as shown in Figs. 1 and 2 with tooth Y of the sprocket wheel engaging the anvil piece 16 of lever 15 when the beam of light projected by the mirror 27 illuminates the zero mark on the row of lines 49. The knob 40 of rod 38 is then rotated for adjusting the length of this rod until its cooperating portion 39 engages the tooth Y' of the sprocket wheel when the beam of light reflected by mirror 41 illuminates the zero mark on the row of lines 48. The distance between the anvil 16 and the end of portion 39 now corresponds to an accurately formed wheel which is indicated by the light beams projecting on the zero mark of the scale. Under this condition a small angular movement imparted to the accurately formed sprocket wheel W in the direction indicated by the arrow will cause the light beams to travel on the rows of lines 48 and 49 in parallel relation to each other. The standard part W is now removed from the supporting points $P_1$ and $P_2$ by an outward sliding movement of point $P_2$ in its supporting bracket 53 against the resistance of its retractile spring shown in Fig. 2 and the part to be tested is, in turn, placed between the points $P_1$ and $P_2$ with one tooth placed for engaging the anvil piece 16 and the other tooth for engaging the end of rod extension 39. The sprocket wheel W to be tested is then rotated a small angular distance of about one degree as to move the rod 39 and anvil 16 so that any difference in the spacing of the teeth Y and Y' will cause corresponding differential movements in the operation of the motion amplifying mechanisms which difference is indicated by the spaced relation of the light beams with respect to each other on the scale. For the measurement of another set of teeth the point $P_2$ is again moved in a sliding movement in the bracket 53 a distance sufficient to permit the passing of the sprocket wheel teeth on the side of anvil 16 and the rod 39 and the point $P_2$ release for engaging the sprocket wheel through the tension of its retractile spring, which again locate the teeth Y and $Y_1$ in line or in registry with anvil 16 and rod 39 for a subsequent testing operation.

Upon the adjustment of anvil 16 and the portion 39 of rod 38 with respect to a standard in the comparing of a machine part, a small angular movement of the part under test is necessary as to make certain that the two amplifier mechanisms are in contacting relation with the part, and in case any deviation in the spacing of the teeth Y and $Y_1$ as in this example occurs, it will be indicated by the projection of the light beams on the rows of marks 48 and 49 of the scale.

It is obvious that minor changes in construction may be made in this device without departing from the spirit of the appended claims and that the ratio of amplification of the lever systems may be made according to the accuracy of measurement desired.

What is claimed is:

1. A gauging device comprising a base having a mounting plate extending perpendicularly with respect to said base, a plurality of motion amplifying means mounted on said plate, each having means for simultaneously engaging portions of the machine part to be measured, a support on said base upon which the machine part is movably mounted, a housing for said amplifying means mounted on said plate, a scale carried by said housing, a lamp, a light reflector for each of said amplifying means mounted in said base adjacent to and in parallel relation to each other, a slitted shield interposed between said lamp and said reflectors, and a plurality of parallelly disposed rows of marks on said scale cooperating with said light reflectors for indicating simultaneously the movement of each of said amplifying means in relation to each other upon the movement of said machine part upon said support, the difference in the amplitude in such movement through movement of said machine part, being an indication of the deviation in the portions of the part under measurement.

2. A gauging device comprising a base having a supporting plate perpendicularly extending therefrom, means on said base for movably receiving the part to be measured, a plurality of cooperating motion amplifying lever mechanisms mounted on said plate each of said mechanisms having means for engaging spaced points on the surfaces of the part to be measured, a light projector actuated by each of said mechanisms and a scale swept over by the light beams of said projectors for indicating the relative movement of said mechanisms in terms of the deviation between the portions of the part under measurement, the operation of the motion amplifying lever mechanism being effected upon a movement of the part.

3. A gauging device comprising a base, a supporting plate perpendicularly extending therefrom, means on said base for movably receiving the part to be measured, a plurality of motion amplifying mechanisms mounted on said plate, each of said mechanisms having means for engaging different portions of the part to be measured, a light projector for each of said mechanisms, a scale having rows of marks swept over by the light beams of said projectors respectively for indicating the distance between the portions of the machine part engaged by each of said means of said mechanisms upon a small angular movement of said machine part.

4. A gauging device comprising a base having a perpendicularly extending mounting plate, means on said base for movably receiving the part to be measured, a plurality of motion amplifying mechanisms pivotally mounted on said plate and having means for engaging different points on the surfaces of the part to be measured, light projectors pivotally mounted on said base, a scale, parallelly disposed rows of marks on said scale swept by the light beams of said projectors, and means for changing the relation of one of said engaging means with respect to the other engaging means to predetermined points on said scale whereby a movement of the part under measurement is effective to actuate said mechanisms, the relative movement of which is an indication of the deviation of the measured part.

5. A gauging device comprising a base having a mounting plate extending perpendicularly from said base, a bracket mounted on said plate, a ribbon spring having its ends secured to said plate and said bracket, a lever mounted for pivotal movement on said spring, an anvil carried at the lower end of said lever, another bracket mounted on said plate, a ribbon spring having its ends secured to the last-mentioned bracket and said plate, a second lever mounted for pivotal movement on the last named spring, a third ribbon spring operatively connecting the adjacent ends of said levers, a light reflector mounted on said base and having an arm, means operatively connecting the second-mentioned lever to said arms for operating said reflector according to the engagement of said anvil piece with the part to be measured, a scale for indicating such a movement, another anvil mounted for axial movement on said plate, a lever mechanism mounted on said plate and operatively engaging the last mentioned anvil, a light reflector actuated by said mechanism, and means for indicating the relative movement of the first and second mentioned anvil upon a movement of the part under measurement for indicating the distance between points on the surface of the part in terms of the deviation between said points.

ELMER C. ERICKSON.